J. W. STEVENS.
TURN TABLE TRUCK.
APPLICATION FILED JUNE 21, 1916.

1,200,148.

Patented Oct. 3, 1916.

WITNESSES

INVENTOR
JOHN W. STEVENS
BY
ATTORNEYS

Ta
UNITED STATES PATENT OFFICE.

JOHN W. STEVENS, OF ST. PAUL, MINNESOTA.

TURN-TABLE TRUCK.

1,200,148.  Specification of Letters Patent.  Patented Oct. 3, 1916.

Application filed June 21, 1916. Serial No. 105,000.

*To all whom it may concern:*

Be it known that I, JOHN W. STEVENS, citizen of the United States, resident of St. Paul, county of Ramsey, State of Minnesota, have invented certain new and useful Improvements in Turn-Table Trucks, of which the following is a specification.

The object of my invention is to provide a truck adapted to support an automobile or other vehicle for movement from place to place in a warehouse or garage or for turning the vehicle around on a central axis.

A further object is to provide a combined turn table and truck of compact, durable construction and one which will eliminate entirely the use of the ordinary garage turn table with the pit beneath it.

The invention consists generally in various constructions and combinations, all as hereinafter described and particularly pointed out in the claims.

Figure 1:
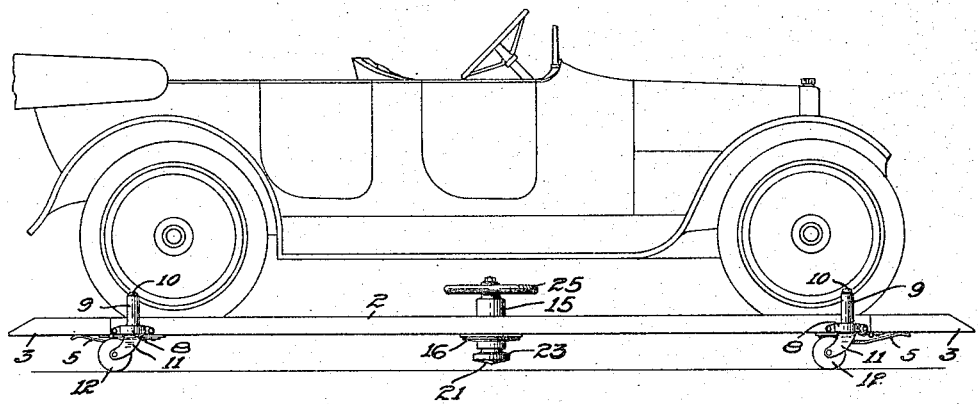
Figure 2:
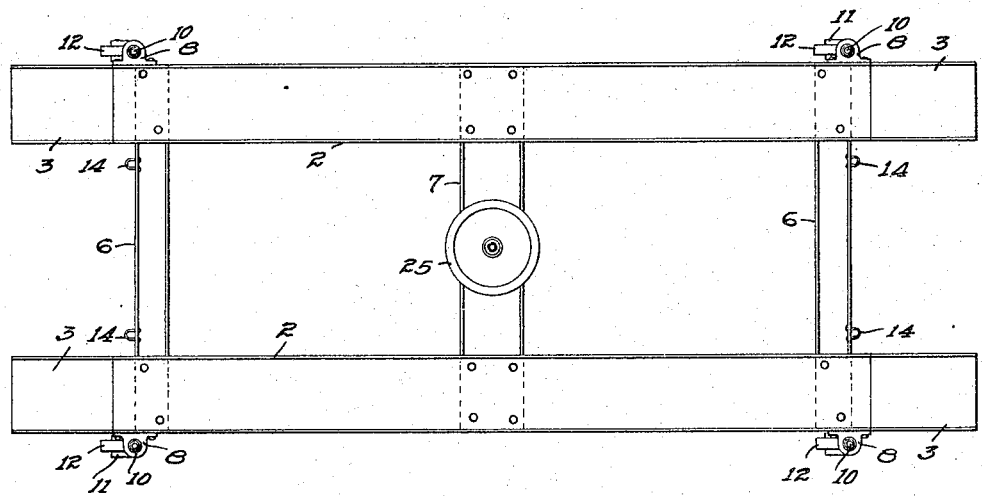
Figure 3:
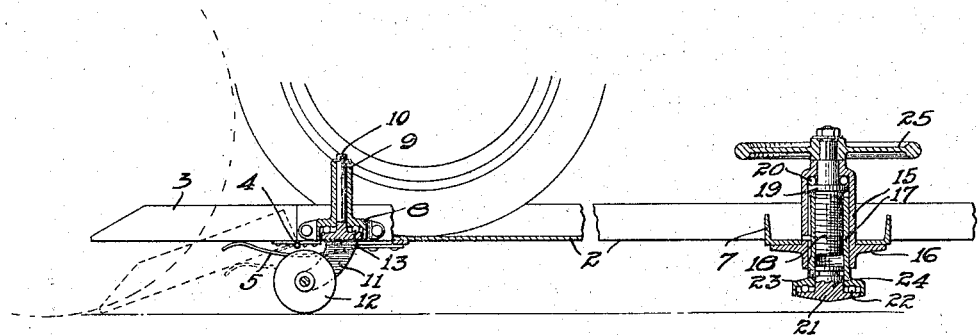

In the accompanying drawings forming part of this specification, Figure 1 is a side elevation of the turn table and truck, showing an automobile resting thereon, Fig. 2 is a plan view of the truck, Fig. 3 is a detail sectional view, showing the bearing of the truck spindles and the manner of mounting the central pivot of the truck in the frame thereof.

In the drawing, 2 represents the side rails of the truck, composed preferably of a channel bar having extensions 3 at each end hinged at 4 to the ends of the rails and normally held in horizontal alinement therewith by springs 5. When the wheels contact with these hinged ends, which are normally a few inches above the floor, as indicated in Fig. 1, said ends will tilt down to an inclined position, as shown by dotted lines in Fig. 3 and form ways on which the wheels of the car may be run from the floor onto the truck. Each end of the truck is similarly equipped with these hinged runways so that the car may run on the truck or run off of it at either end. The rails 2 are connected by end bars 6 and by a central bar 7 and adjacent to the ends of the bars 6 are brackets 8 secured to the outer flanges of the channel bar side rails 2, said brackets having vertical bearings 9 for spindles 10 projecting upwardly from the forks 11 wherein the truck wheels 12 are mounted. Anti-friction bearings 13 are provided between the upper portions of the fork 11 and bearing surfaces provided in the brackets 8 form a swivel support for the truck wheels, allowing them to revolve around a vertical axis and adjust themselves to roll in the direction in which it is desired to move the truck. Draft connections 14 are provided on the bars 6 for convenience in moving the truck from place to place.

It is often desirable, particularly in the garage, to reverse the position of the car and I therefore provide means for conveniently converting the truck into a turn table, said means consisting in mounting a housing 15 on the member 7 having a flange 16 to bear thereon. A sleeve 17 is fitted within said housing and free to slide therein but held against rotary movement. This sleeve is internally threaded to engage the threads of a stud 18 having a rib 19 formed thereon between which and the upper wall of the housing bearing balls 20 are inserted. A head 21 is provided at the lower end of the sleeve and has bearing balls 22 interposed between it and the flanged lower end 23 of said sleeve. Said head is mounted in said sleeve by means of a shank 24 having an annular groove therein to receive the pin on the sleeve, thereby permitting the head to turn freely, independently of the sleeve, but preventing independent vertical movement. The upper end of the stud 18 has a hand wheel 25 thereon for revolving it and feeding the sleeve and head downwardly to contact with the ground or floor and raise the truck wheels sufficiently to allow the truck to be revolved on its central axis. The wheel 25 is located conveniently under the car, where it can be reached by the operator to raise or lower the stud and convert the device into a turn table or truck, as may be desired.

The device, while composed of but few parts, and comparatively simple in construction, is strong and durable and can be used wherever it is desired to move a car or other vehicle about or to reverse its position. In a garage it eliminates entirely the usual turn table and pit and effects a considerable economy in the cost of construction and being in effect a portable turn table, it has all the functions of an ordinary turn table and in addition those of a truck for moving the car or vehicle bodily from place to place in the garage or warehouse.

I claim as my invention:

1. A combined truck and turn table comprising a frame, supporting wheels swiveled on said frame and on which the truck may be moved from place to place, and a vertically movable central pivot supported in said frame and having a head to contact with the floor for raising the truck wheels off the floor.

2. A combined truck and turn table comprising a frame, supporting wheels swiveled on said frame and on which the truck may be moved from place to place, a head centrally mounted on said frame and having antifriction bearings in its support, means for moving said head downwardly to contact with the floor and raise said supporting wheels off the floor or raise said head to allow said wheels to drop back upon the floor, whereby the device may be converted from a truck to a turn table or vice versa.

3. A combined truck and turn table comprising a frame, supporting wheels swiveled on said frame and on which the truck may be moved from place to place, guide-ways pivotally supported at the ends of said frame and normally forming continuations of the side rails thereof, said guide-ways being adapted to swing down and contact with the floor and forming inclines for directing the wheels of a vehicle upon said frame, a head centrally mounted on said frame, and means for forcing it downwardly against the floor and raising said wheels out of contact with the floor to convert said truck into a turn table.

In witness whereof, I have hereunto set my hand this 17th day of June, 1916.

JOHN W. STEVENS.

Copies of this patent may be obtained for five cents each, by addressing the "Commissioner of Patents, Washington, D. C."